AUTOMATIC TELETYPEWRITER TRANSMITTER

Filed Feb. 23, 1961 4 Sheets-Sheet 1

INVENTORS.
L. LAMIN
J. KARKLYS
BY
Phillip A. Weiss
ATTORNEY

AUTOMATIC TELETYPEWRITER TRANSMITTER

Oct. 16, 1962 L. LAMIN ET AL 3,059,048

AUTOMATIC TELETYPEWRITER TRANSMITTER

Filed Feb. 23, 1961 4 Sheets-Sheet 4

United States Patent Office 3,059,048
Patented Oct. 16, 1962

3,059,048

AUTOMATIC TELETYPEWRITER TRANSMITTER

Leonard Lamin, Oak Park, and Joseph Karklys, Chicago, Ill., assignors to International Telephone and Telegraph Corporation, New York, N.Y., a corporation of Maryland Filed Feb. 23, 1961, Ser. No. 91,125
14 Claims. (Cl. 178—3)

This invention relates to teletypewriter transmitters and more particularly to means for automatically transmitting predetermined or variable information in teletypewriter code to a plurality of subscriber stations.

Most telegraph type messages now transmitted and received are originated by mechanical devices known as teletypewriters incorporating keyboards similar to the standard typewriter keyboard. These teletypewriters use a special code in which each letter, numeral, or punctuation character consists of five units or elements of equal length. The teletypewriters are so designed that when a certain letter key is operated at a transmitting subscriber office, control equipment is actuated which causes marking and spacing signals corresponding to a code for that character to be sent out on a telegraph line. When the code representing the particular character is received by control equipment of a receiving subscriber office, the corresponding character key is selected and operated to print the desired character.

Quite obviously, the sending and receiving teletypewriters must be able to send and receive the same coded signals. Therefore, the telegraph transmission industry has standardized on such things as the speed at which code signals are transmitted. However, as equipment has improved, the speed has increased to make maximum use of available transmission media. The result is that there are now three commonly used transmission speeds, i.e. 60, 75, and 100 words per minute. A "word" is defined as five characters, each including a start pulse, followed by the five units during which a standard code identifies a particular letter, other character, or a "stunt" (a machine function such as a carriage return, a stop signal, or the like).

In addition to the increase in transmission speed, the improvements in equipment have also produced different types of control equipment for the transmitting and receiving systems. For example, some of the original control equipment used "distributors" comprised of commutator and brush assemblies built into each teletypewriter. The commutator segments at the transmitter station were energized in accordance with the code by the operation of a letter key. Because the transmitting and receiving commutators operate synchronously corresponding segments on the receiving commutator were energized and caused the corresponding character key to operate to print the desired character. The rotating distributor device is troubled by wear on the brushes and other moving parts with a resulting loss in reliability. The rate of speed of operation is necessarily limited by the mechanical portions of the circuit which are large, unwieldy and expensive. Also, there is a lack of compatibility between receiving and transmitting systems operating at different transmission speeds.

The advent of solid state devices and the development of logic circuitry now make it possible to eliminate these rotating distributors and to incorporate features previously unobtainable. For example, there are many messages, sometimes called "canned" information, that are sent repeatedly such as time, date or station identification information, pricing information, slogans, and the like. If this type of information is sent automatically when an operator activates a single key, there is a great savings in time and in wear and tear on the equipment as well as the operator. The utility of such automatic transmission is enhanced if data storage and read-out equipment is sufficiently sophisticated to simultaneously serve systems operating at different speeds.

Therefore, an object of this invention is to provide an improved teletypewriter system and more particularly to provide automatic message transmission at different speeds.

A further object of this invention is to provide an improved teletypewriter system, which can automatically send stored data to any existing equipment.

Still another object of this invention is to provide an improved teletypewriter system wherein stored information can be simultaneously transmitted over systems at different speeds and received by receivers that operate at different transmission speeds.

Still another object of this invention is to provide a reliable and economical teletypewriter system that is comparatively easy to construct, use, and service.

In accordance with one aspect of this invention, "canned" information is automatically sent through a system employing keyboard sending and teleprinted reception devices at any conventionally used transmission speed. To accomplish this, the information is digitally stored or read-off a device such as a clock, for example. When an operator at any teletypewriter in the system operates a data request key, this digital information is read-out of storage under the control of a programmer operated at a rate fixed by the slowest transmission speed. This read-out information is fed into a converter which converts it into code signals for use in systems employing keyboard sending and teleprinted reception devices. This coded information is then fed into a number of gate circuits, each of which is individually scanned at a rate corresponding to one of the transmission speeds. When each gate circuit is simultaneously energized by one of the code signals and by a signal from its associated scanner, an enabling pulse is sent to the line circuit causing a space to be transmitted through the system. In this manner, the "canned" information is transmitted through the system at the speeds of the stations where a data request key is operated. If data request keys are operated to indicate that several transmission speeds are required simultaneously, the "canned" information is simultaneously sent in each of these speeds.

Thus, without the use of any revolving equipment, and through the use of economic and reliable solid state devices, a system that can simultaneously read-out stored information in groups of stations operating at a plurality of different speeds is provided.

The above mentioned and other objects and advantages of this invention and the manner of obtaining them will become more apparent and the invention itself will be best understood, by reference to the following description of an embodiment of the invention taken in conjunction with the accompanying drawings wherein:

FIG. 1 shows by block diagram an exemplary teletypewriter system utilizing the subject invention;

FIGS. 2, 3, and 4 are block and schematic diagrams showing in greater detail the data read-out and common equipment of block 25;

FIG. 5 explains the logic symbols utilized in FIGS. 1, 2, 3, and 4; and

FIG. 6 shows the manner in which FIGS. 2, 3, and 4 should be joined to provide a complete and understandable circuit.

Simple and specific terms are used in the following specification where possible to facilitate an understanding of the invention; however, it should be understood that the use of these simple and specific terms does not act in any manner as a disclaimer of the full range of equivalents which is normally given under established principles of patent law. To illustrate this point, the attached drawings, particularly FIG. 1, show the three pairs of stations operating at different speeds. Actually, it should be understood that this invention applies to systems comprising at least twenty pairs of stations operating at any and all different transmission speeds. Still further, the drawings of FIGS. 1, 2, 3, and 4 show a clock feeding information to a decimal converter unit; however, the information may be stored data that may include any recurring message, such as the name of a company, pricing information, advertising slogans, etc. Quite obviously, other examples could be selected to illustrate the manner in which the specific terms that have been used herein are entitled to a wide range of equivalents.

In the drawings and the description which follows a memory device including a "flip-flip" circuit is sometimes referred to. One such circuit is shown by a logic symbol in FIG. 5 as a rectangle having a bisecting line. If the input terminal (marked by an arrowhead) is energized, the flip-flip turns "on" to energize the output conductor, thus remembering the energizing signal. If the reset terminal (marked by a heavily inked dot) is energized, the flip-flip turns "off" to deenergize the output terminal, thus forgetting the energizing signal and remembering the resetting signal.

Another logic symbol as shown in FIG. 5 is an "OR" gate depicted by a semi-circle having input conductors intersecting its chord. Energization of any input conductor causes a corresponding current flow through the output terminal.

An "AND" gate, such as shown in FIG. 5 is shown by a semi-circle including an ampersand. The simultaneous energization of all input conductors causes a current flow through the output terminal.

A "gate circuit" is shown in FIG. 5 as a circle enclosing a triangle. If the switch conductor (marked by an arrowhead) is energized, the gate turns "on" and any signal on the input conductor is applied to the output conductor. If the switch conductor is deenergized, the output conductor is deenergized.

An "inhibit circuit" is shown in FIG. 5 by a semicircle having one input conductor marked by a heavily inked dot. If the dotted conductor is not energized, any signals appearing on the other input conductors are applied to the output conductor. If the dotted conductor is energized, the output conductor is deenergized.

GENERAL DESCRIPTION

FIG. 1 shows a system of transmitting messages over a distance by using keyboard transmitting and typeprinted reception devices including three pairs of subscriber stations, each pair being interconnected by a telegraph media, one of which is shown as line 10. Each pair of stations operates at a different transmission speed, i.e. stations A and B operate at a speed of 60 words per minute (60 w.p.m.), stations C and D operate as a speed of 75 words per minute (75 w.p.m.), and stations E and F operate at a speed of 100 words per minute (100 w.p.m.). Individually associated with each of the stations are line circuits such as line circuits 11–13. Also associated with each of the individual subscriber stations is any suitable data request means, here shown as keys 14–16, used for requesting an automatic transmission of "canned" information.

Common to all of the subscriber stations is the data read-out equipment of block 25. This equipment includes means for providing information signals relating to messages that are transmitted repeatedly, such as the source of "canned" information 26, a circuit for commanding the read-out of the stored data, such as programmer 26, means for translating the read-out data into a code comprising a plurality of scan circuits 27, converter 29, and a plurality of gate circuits 31 which are individually scanned at rates corresponding to the transmission speeds.

The source of "canned" information is here shown as including a clock 35 which feeds into a decimal converter circuit 36; although it should be understood that the "canned" information may also be prerecorded on a perforated tape, a magnetic drum, or the like.

The scan circuits 27 include a number of individual circuits 37–39, each of which is operated at a speed corresponding to one of the transmission speeds used in this exemplary system. For example, the scan circuit 37 is driven at a 60 w.p.m rate by a pulse generator 41; the scan circuit 38 is driven at a 75 w.p.m. rate by a pulse generator 42; and the scan circuit 39 is driven at a 100 w.p.m. rate by a pulse generator 43.

The programmer 28 is driven by the scan circuit 37, which is the one that operates at the slowest transmission speed, in this case 60 w.p.m. The programmer, under the control of the scan circuit 37, provides a recurring series of eleven sequential command signals. The first three commands are "stunt" signals, the next four commands cause read-out of the "canned" information, the next three commands are "stunt" signals, and the last command is an end of message signal.

The converter 29 is here shown as a circuit having five output conductors which are selectively energized responsive to the "canned" information received from circuit 36 as decimal code signals. These output conductors are connected to each of the three gate circuits 31 via common cable 45, over which the code is sent. If, for example, the decimal code signal received by converter 29 from information source 26 indicates the numeral 3 [which in the code used is a mark followed by four spaces] then there is no pulse transmitted over the conductor 46, and enabling pulses are transmitted over the remaining conductors in cable 45.

Each of the transmission gate circuits 31 is individually scanned at a rate corresponding to one of the transmission speeds. More particularly, circuit 37 scans the gate 48 at a 60 w.p.m. rate via conductors 49. The gates 51, 52 are scanned at 75 w.p.m. and 100 w.p.m. rates, respectively, in a similar manner. When signals are simultaneously received at a gate circuit from the converter 29 and from an associated scanner, a pulse is sent to the line circuits 11–13. For example, gate circuit 48 would transmit this pulse over conductor *50a*.

It is thought that the remaining components of FIG. 1 will be understood best from the following description of how the system operates. For this purpose, it is assumed that subscriber station C is transmitting and that stations A, E are idle.

To request the transmission of "canned" information, a data request key 15 is operated and a ground (+) pulse is sent to a logical memory signal producing means such as flip-flip 61 over a circuit traced from a positive potential through key 15, conductor 62, to the input of "OR" circuit 63, contacts K14, K25, K35, through resistor R11 to ground. The IR voltage drop produced across R11 is applied to set the input of flip-flip 61 causing flip-flip 61 to generate a signal at its output terminal.

A memory means within the line circuit 22 remembers the operation of key 15. In greater detail, capacitor C11 is charged by the positive potential applied thereto responsive to the operation of key 15. While the capacitor retains its charge, a gate circuit G1 remains open for a period in the order of 10 milliseconds in this exemplary circuit. If the circuit comprising contacts K14, K25 and K35 is closed and conducting, the capacitor discharges thereby actuating the gate to allow the signal from flip-flip 61 to be applied. On the other hand, if the circuit comprising contacts K14, K25 and K35 is open because the common equipment of block 25 is busy, then the capacitor retains its charge and thus "remembers" the operation of the key until all the contacts K14, K25 and K35 are closed, at which time the capacitor discharges through R11 to actuate flip-flip 61 and the gate.

The output signal of flip-flip 61 is applied to the input of all of the gate circuits G1–G3 in the line circuits. Only gate G1 is open, however, because only key 15 has been operated. Therefore, the output of flip-flip 61 acts over an obvious circuit to operate a means for transferring the control of the line from the transmitting subscriber station to the common equipment of block 25 such as relay K20.

Responsive to the operation or relay K20, contacts K21 open and thereby place the transmission line 70 under the control of a glass reed relay K50 having normally closed contacts K51. Contacts K22 close to divorce relay K20 from dependence upon the gate circuit G1. That is, relay K20 is now held operated over a circuit extending from negative battery through the relay coil and contacts K22 to the output of flip-flip 61. Also responsive to the operation of relay K20, contacts K23 close to connect the 60 w.p.m. pulse generator 41 to the 60 w.p.m. scan circuit 37 over an obvious circuit. In a similar manner, contacts K24 close to connect the 75 w.p.m. pulse generator 42 to the 75 w.p.m. circuit 38. Normally closed contacts K25 open to disconnect the output of "OR" circuit 63 from the input of flip-flip circuit 61, thereby isolating that flip-flip from all the data request keys.

It should be noted that each of the pulse generators 41–43 operates at a frequency which drives its associated equipment at a fixed transmission speed.

In this explanation wherein subscriber stations A and E are idle, the output of the gate circuits 48, 52 associated with 60 w.p.m. and 100 w.p.m. transmissions are shorted because relays K10, K30 are unoperated. Therefore, contacts K11 and K31 shunt reed relay contacts K41, K61, respectively. Also it should be noted that each telegraph line is completed at the subscriber station by normally closed contacts (not shown).

A common equipment busy condition is recognized by the line circuits 11, 13 when gates G2, G3 remain closed because the circuit to R11 is open. If the line circuits 11, 13 are in this condition when the subscribers operate keys 14 or 16, then the charges built on capacitors C12, C13 serve to remember the request for data placed at stations A, E until after the needs of station C have been served.

Responsive to the output of the pulse generator 41, the scan circuit 37 operates. The output pulses of scan circuit 37 cause programmer 28 to operate and emit its own pulses. Five pulses emanate from programmer 28 to cause decimal converter 36 to divulge its stored data to converter 29 wherein it is changed from decimal code to five-element code. Responsive to the connection thereto of its associated pulse generator 42, scan circuit 38 operates and causes transmission gate 51 to transmit the teletype information over the communication channel 70 associated with line circuit 12.

Generally, transmission comprised of a series of coded marks and spaces are sent over the lines 10, 70, 71 when signals from the scan circuits arrive at the transmission gates simultaneously with the signals from the code converter 29. Specifically, when a signal arrives at transmission gate 51 from converter 29 simultaneously with a signal from scan circuit 38, an output pulse is transferred to a transmission means such as reed relay coil K50.

Responsive to the receipt of this pulse, reed relay K50 operates and opens normally closed contacts K51 to transmit a space. A mark is transmitted when contacts K41 are in their normally closed position. No information is transmitted over communication channels 10, 71 because contacts K11, K31 are closed and therefore shunt contacts K41 and K61.

Means are provided for driving the programmer under the control of the slowest scan circuit, the programmer being adapted to read-out said information in discrete blocks of data when so driven. In greater detail, each of the scan circuits 37–39 emits eight sequential output signals which command the read-out of a single block of the information. Generally the first signal is a start signal; and this signal from scan circuit 37 is also used to step programmer 28 and reset flip-flips 65, 66 which unblock inhibit gates 67, 68 and thereby allow scan circuits 38 and 39 to receive step pulses from pulse generators 42, 43. The second through sixth signals are the five pulses that comprise each character. The seventh signal from scan circuits 38 and 39 resets flip-flips 65, 66 which means that once again inhibit gates 67, 68 are blocked to turn "off" the scan circuits 38, 39. Specifically, the output of pulse generator 42 goes through contacts K24 and inhibit gate 67 to cause scan circuit 38 to operate. After a block of information is read-out, circuit 38 is at its seventh position and sends a pulse to the input terminal of flip-flip 65, turning that flip-flip "on" and inhibiting gate 67, thereby removing the step pulse signals from the scan circuit 38 so that it ceases operation. Scan circuit 38 reaches its seventh sequential position before scan circuit 37 because it is operating at a higher speed under the control of pulse generator 42. When scan circuit 37 reaches its first position again, the pulse it sends resets flip-flip 65 turning it "off," thereby opening the inhibit gate 67 which once again starts the operation of scan circuit 38. At the same time programmer 28 is actuated to cause the read-out of another block of information and another coded character to be transmitted over line 70.

This cycle of operation continues until the programmer 28 reaches an eleventh sequential position which occurs after the entire "canned" information has been transmitted. At that position the programmer sends an end of signal pulse to reset flip-flip 61. This causes the holding potential to be removed from relay K20 which releases.

Responsive to the release of relay K20 contacts K21 close to shunt contacts K51 and remove the control of line 70 from the common equipment of block 25. At the same time contacts K22 open to remove the circuit that previously shorted gate G1. Contacts K23 open to disconnect pulse generator 41 from scan circuit 37 and contacts K24 open to disconnect pulse generator 42 from scan circuit 38, thus halting the scan operation. Contacts K25 close to restore the operating circuit of flip-flip 61. Thus, the circuit is returned to normal and all lines are again under the control of the subscriber station teletypewriters.

As soon as the common equipment is no longer busy, flip-flip 61 no longer supplies a signal, relays K10, K20, and K30 are not operated, and hence contacts K14, K25, and K35 are closed. Therefore, any potential due to a charge on the capacitors causes flip-flip 61 to be set once again and its output signal is transmitted through whichever of the line circuit gates G1, G2, or G3 are operated.

The description to this point discloses that transmission of the "canned" information is always under the control of the scan circuit operating at the slowest speed, in this case, scan circuit 37. Only the circuit wherein the data request key, such as key 15, has been operated is effected by the signals emitted from the transmission gates 48, 51, and 52. In the other circuits, the output of the associated transmission gate is nugatory since the reed relay contacts are shorted by relay contacts. In this way the system of the invention provides automatic transmission of stored data at different transmission speeds.

Now, assume that the common equipment shown in block 14 is busy when each of the subscribers A, C, and E operate their data request keys 14, 15, and 16. Responsive thereto memory means in the line circuits function, for example, the capacitors C11–C13 charge. There is no discharge path for any of the capacitors through R11 because contacts such as contacts K14, K25 and K35 are open. When the programmer 28 extends an end of signal pulse to reset flip-flip 61 the hold potential is removed from relays K10, K20, and K30 which release. Contacts K14, K25, and K35 close to extend a discharge path for capacitors C11–C13 through "OR" gate 63 and resistor R11 to ground. The discharge current simultaneously sets flip-flip 61 and opens gates G1–G3. The output signal from flip-flip 61 reoperates relays K10, K20, and K30 through gates G1–G3.

Responsive to the reoperation of relay K10, contacts K11 open to remove the shunt from across reed relay contacts K41; contacts K12 close to shunt gate G2 in the relay K10 operating circuit; contacts K13 close to connect pulse generator 41 to scan circuit 37; and contacts K14 open the capacitors discharge circuit. Relays K20 and K30 operate to perform similar functions.

Responsive to the receipt of a first signal from pulse generator 41, scan circuit 37 commences operation by transmitting a start signal over lead 76 to reset flip-flip circuits 65, 66 and to step programmer 28. The start signal is also connected to gate 48 through lead 77. Responsive to the continuing signals from generator 41 scan circuit 37 sequentially transmits five signals to gate 48 over cable 49 and finally two additional signals are emitted but not transmitted. The omission of signals act as the code stop signals.

In a similar manner the scan circuits 38, 39 operate responsive to signals received from pulse generators 42, 43, respectively. However, they are not connected to the programmer via conductor 76. Thus, their respective start signals do not advance the programmer. Instead, the stop signals emanating from the scan circuits 38, 39 are applied to set the flip-flip circuits 65, 66 and consequently block inhibit gates 67, 68. All three gates 48, 51, and 52 start simultaneously as soon as a code signal is received from converter 29. The fastest scanner 39 finishes first, sets its flip-flip 66 and waits; the next fastest scanner 38 finishes second, sets its flip-flip 65 and waits; and the slowest scanner 37 finishes last. The next code signal is released by the converter and each gate immediately starts sending. Thus, the system disclosed by this invention provides for simultaneous transmission of stored information at different transmission speeds.

DETAILED DESCRIPTION

Figure 2:
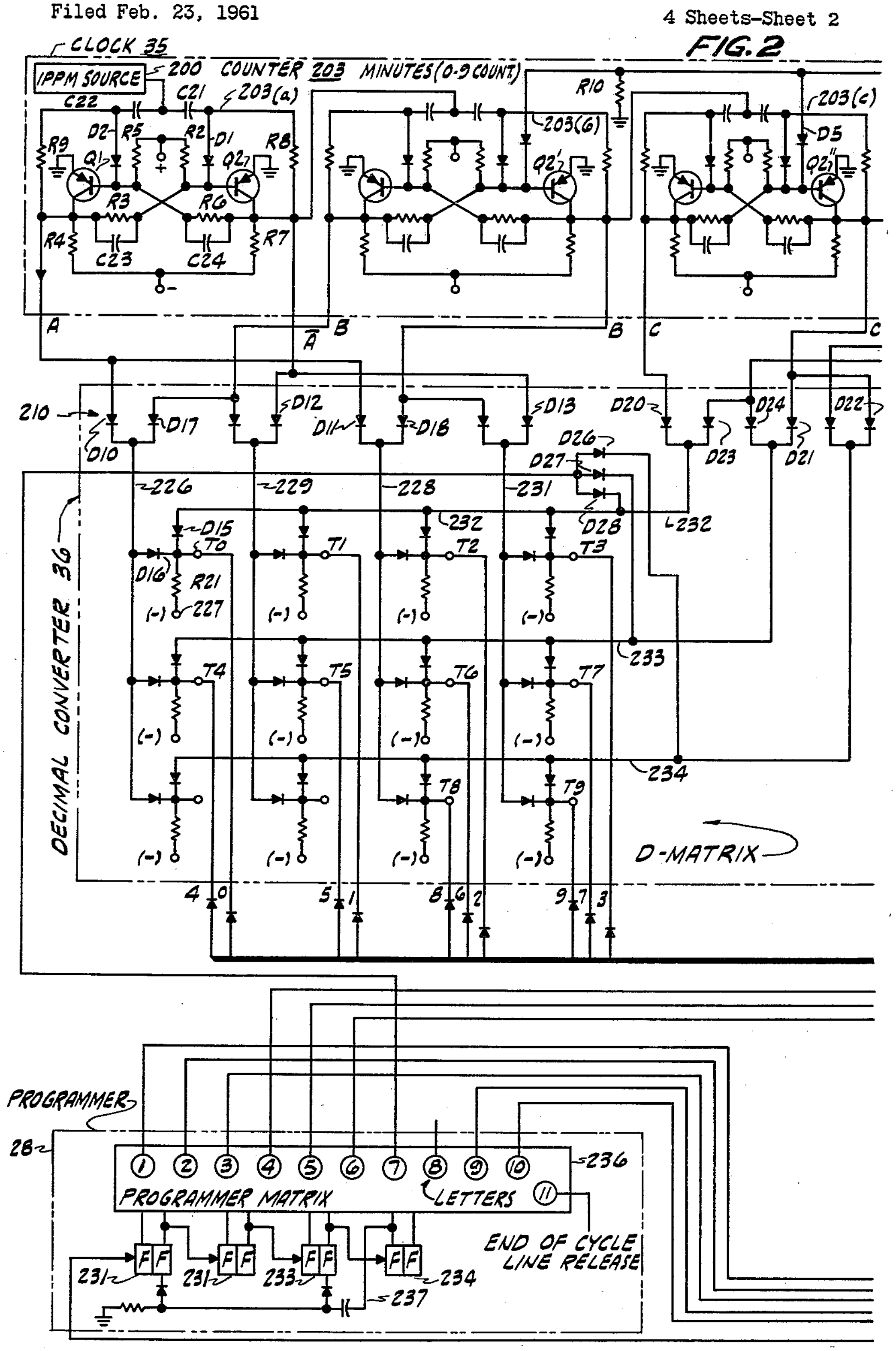
Figure 3:
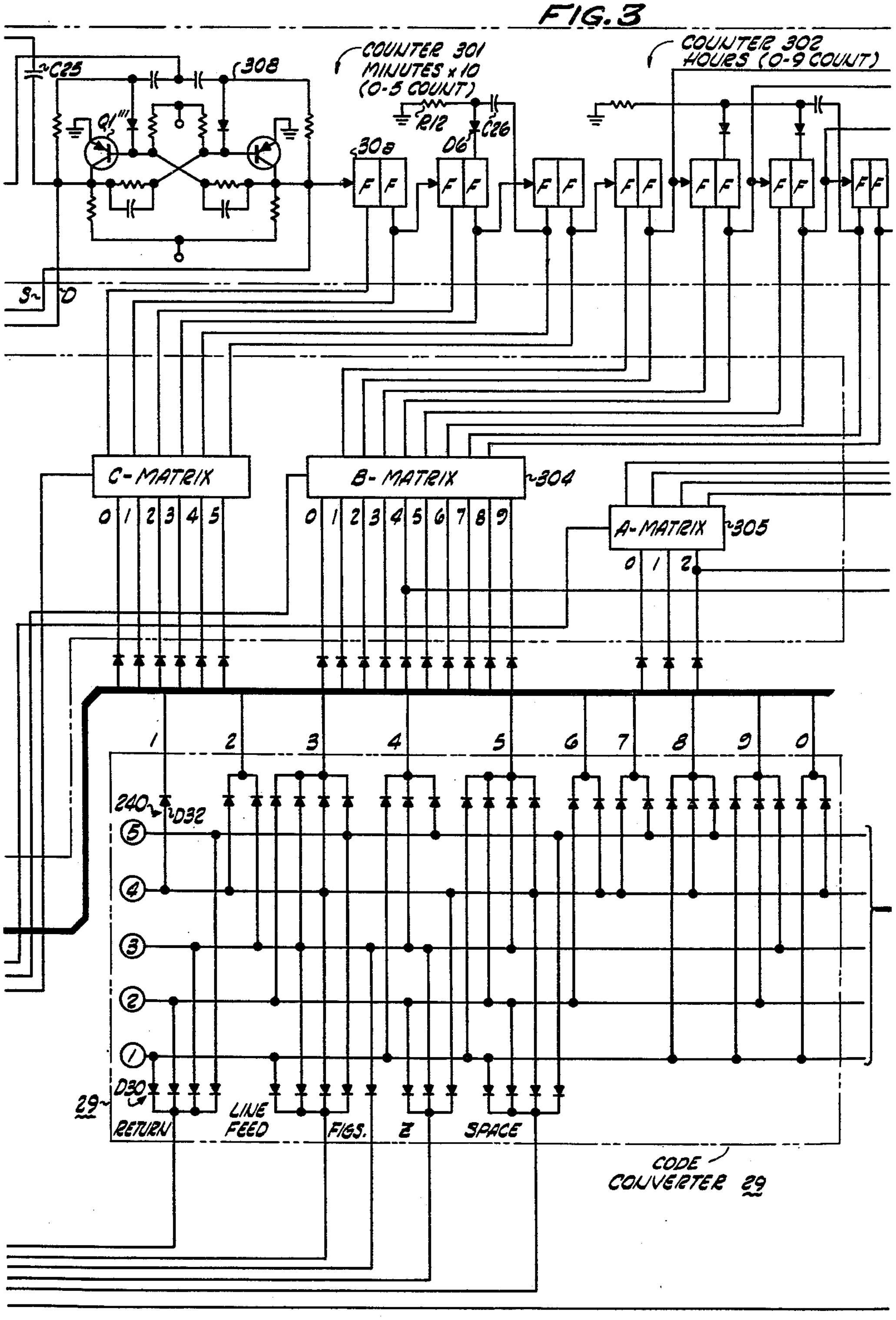
Figures 4, 5, 6:
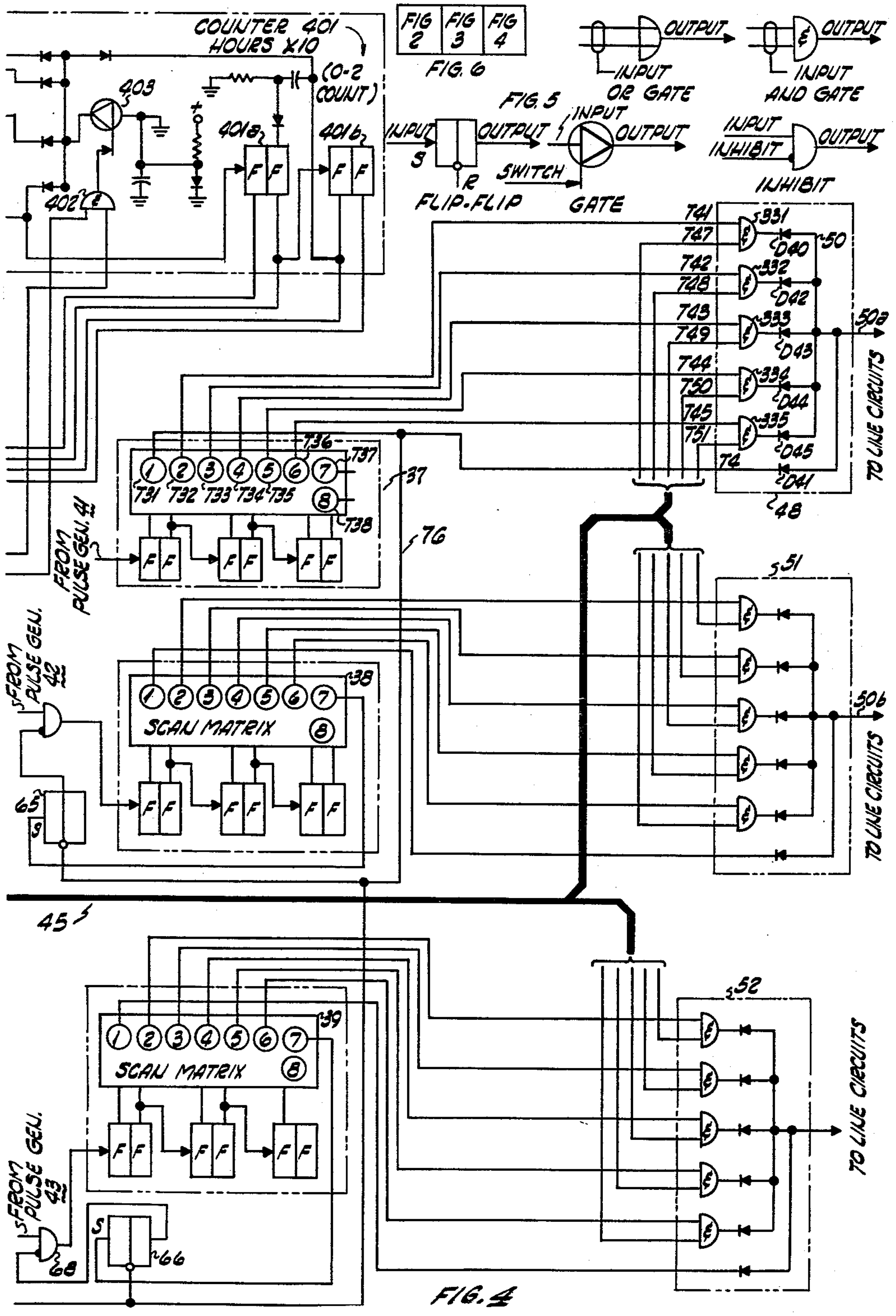

A more complete understanding of the invention will result from the following description of details of the automatic transmission system and particularly of the data read-out and common equipment of block 25 as it is shown in FIGS. 2, 3, and 4 inclusive.

*Operation of the Clock.*—In an exemplary circuit an electronic timing means such as clock 35 is used to supply the "canned" information. The clock is comprised of a one pulse per minute source 200 which drives directly or indirectly a pulse counting means such as the four binary counters 203, 301, 302, and 401. Each binary counter includes a number of flip-flop stages. More specifically, the binary counter 203, used to count minutes, is comprised of four flip-flop stages 203(*a*), 203(*b*), 203(*c*), and 303 with appropriate reset circuitry to enable it to give a 0–9 count when its output is connected to a binary to decimal converter.

Binary counter 301, used to count ten minute intervals, is comprised of three flip-flop stages with appropriate reset circuitry to enable it to give a 0–5 count when connected to a binary to decimal converter.

Binary counter 302, used to count hourly intervals, has four flip-flop stages with appropriate reset circuitry to enable it to give a 0–9 count when its output is connected to a binary to decimal converter.

Binary counter 401, used to count ten hour intervals, includes two flip-flop stages with appropriate reset circuitry to enable it to give a 0–2 count when its output is connected to a binary to decimal converter.

Associated with all of these counters is reset circuitry designed to return the clock to its zero condition after it has counted twenty-four hours.

All of the flip-flop stages used in the clock are identical and therefore only the details of the flip-flop circuit 203(*a*) and the reset circuitry of binary counter 203 are described. The other counters, shown in block diagram form, operate in the same manner.

Briefly, the principal components of this flip-flop stage are a pair of transistors Q1, Q2, which may be PNP junction type devices. Each transistor has its emitter (indicated by an arrowhead showing the direction of positive current flow) connected to ground. The base bias for each transistor is established by a voltage divider connected between a (+) battery and a (−) battery. For example, the base bias for transistor Q2 is established by the voltage divider including resistors R2, R3, and R4, and more particularly by the potential at the junction between resistors R2, R3. If transistor Q1 is turned "on," its emitter ground appears at the junction between resistors R3, R4 in lieu of the (−) battery. This ground holds the output terminal A at ground potential and causes the base of transistor Q2 to be positive relative to its emitter. A PNP device such as transistor Q2 turns "off" when so biased. With transistor Q2 turned "off" the (−) battery connected to resistor R7 appears at terminal $\bar{A}$. There is a similar circuit for transistor Q1.

The circuit 203(*a*) operates this way. Its input signals are received from the one pulse per minute source 200. After the receipt of a "zero" pulse transistor Q1 does not conduct and transistor Q2 does conduct. Transistor Q1 does not conduct because ground appears at the junction of resistors R6, R7. Hence, terminal A goes to the negative potential applied through load resistor R4. Transistor Q2 is conductive because its base is tied into the voltage divider circuit, resistors R2–R4, and further because the emitter ground of non-conductive transistor Q1 does not appear at the junction between resistors R3, R4. Therefore, there is a ground potential at the collector of transistor Q2 and at output terminal $\bar{A}$.

In carrying out this invention, the first positive pulse injected by the pulse generator appears on the base of transistor Q2 over a circuit that extends through coupling capacitor C21 and diode D1 driving transistor Q2 to cut-off. The current in the positive going direction extends through diode D1 but not through diode D2 because resistor R8 connected to the positively biased collector of transistor Q2 forward biases diode D1 connected to the negatively biased base of transistor Q2; whereas resistor R9 connected to the negatively biased collector of transistor Q1 reverse biases diode D2 connected to the positively biased base of transistor Q1. When the base of transistor Q2 starts going positive, the collector current of that transistor diminishes along with the base current. The diminishing base current effectively reduces the voltage drop across resistor R3, causing the base to go more positive, further decreasing the collector and base current until transistor Q2 cuts-off. Capacitors C23, C24 acting in conjunction with resistors R3, R6 determine the fall time of transistors Q2, Q6. When transistor Q2 cuts-off, the base of transistor Q1 becomes negative because of its connection to the voltage divider that extends from positive voltage through resistors R5, R6, and R7 to negative voltage. Since the value of resistors R7 and R6 combined is much less than that of resistor R5, the base of transistor Q2 is made more positive, since it is now effectively tied to the voltage divider that extends the positive voltage through resistors R3, R4 to ground. Therefore, when the input pulse goes from negative to positive, the ground at $\bar{A}$ is superseded by a negative voltage that can be traced from a negative voltage source connected through resistor R7 to terminal $\bar{A}$. The negative voltage previously supplied to terminal A is replaced by a ground extended from the emitter of transistor Q1 to the collector thereof and to terminal A. At the same time, a negative pulse is applied to the next flip-flop stage 203(*b*).

Thus, the first positive input pulse to counter 203 causes terminal A to become grounded and terminal $\bar{A}$ to go to a negative potential. The second input pulse reverses this condition. Since the output of stage 203(*a*) is connected to the positive input of stage 203(*b*), it changes its output when $\bar{A}$ goes from a negative to ground potential. Hence, it is shown that the flip-flop outputs are changed when the input pulse is a changing potential going from a negative to a ground potential. The binary counter is preset to operate responsive to pulses in accordance with the following truth table.

TABLE 1

| Input Pulses | Binary Outputs | | | | | | | |
|---|---|---|---|---|---|---|---|---|
| | A | $\bar{A}$ | B | $\bar{B}$ | C | $\bar{C}$ | D | $\bar{D}$ |
| 0 | 1 | 0 | 1 | 0 | 1 | 0 | 1 | 0 |
| 1 | 0 | 1 | 1 | 0 | 1 | 0 | 1 | 0 |
| 2 | 1 | 0 | 0 | 1 | 1 | 0 | 1 | 0 |
| 3 | 0 | 1 | 0 | 1 | 1 | 0 | 1 | 0 |
| 4 | 1 | 0 | 1 | 0 | 0 | 1 | 1 | 0 |
| 5 | 0 | 1 | 1 | 0 | 0 | 1 | 1 | 0 |
| 6 | 1 | 0 | 0 | 1 | 0 | 1 | 1 | 0 |
| 7 | 0 | 1 | 0 | 1 | 0 | 1 | 1 | 0 |
| 8 | 1 | 0 | 0 | 1 | 0 | 1 | 0 | 1 |
| 9 | 0 | 1 | 0 | 1 | 0 | 1 | 0 | 1 |

0 indicates a positive potential; 1 indicates a negative potential.

Means are provided for limiting the binary output of clock circuit 203 to the ten binary combinations that are required for a decimal 0–9 count. Since four flip-flop stages would otherwise provide sixteen possible binary combinations. Generally speaking, this means comprises the circuitry required to reset the four stage flip-flop binary counter after it has counted seven pulses. This reset circuitry includes a capacitor C25, diodes D4, D5 and a diode biasing resistor R10. When the output at terminal $\bar{C}$ changes from a negative to a ground potential, the transistor Q1‴ in stage 303 conducts, a positive pulse is transmitted through the coupling capacitor C25 and the diodes D4, D5 to the base electrodes of the transistors Q2′, Q2″ in the stages 203(*b*), 203(*c*). Since NPN devices switch "off" when their base electrodes become positive, the transistors Q2′ and Q2″ switch "off" in response to this positive pulse. Prior to the change of potential at output D which causes these transistors to switch "off," the counter potentials on each of the outputs correspond to the potentials indicated by the truth table at pulse No. 7. Without the reset circuit the following output potentials would appear at the terminals in response to pulse No. 8.

*Without Reset Provisions*

| | Binary Outputs | | | | | | | |
|---|---|---|---|---|---|---|---|---|
| | A | $\bar{A}$ | B | $\bar{B}$ | C | $\bar{C}$ | D | $\bar{D}$ |
| Input Pulse No. 8 | 1 | 0 | 1 | 0 | 1 | 0 | 0 | 1 |

However, because of the reset circuit, the potentials that appear correspond to the potentials indicated at pulse No. 8 in the truth table. In this manner, six of the binary counts are dropped and the total of sixteen possible combinations are reduced to ten.

The output that is connected to terminal $\bar{D}$ is also connected to the first stage 301(*a*) of the three stage counter 301. Therefore, when the potential at $\bar{D}$ goes from its negative state toward ground, the first flip-flop of counter 201 is operated in a manner similar to that of the counter 203 explained above. Since the binary counter 301 network consists of three stages with a possible combination of eight binary output signals, there is a reset circuit including resistor R12, diode D6, and capacitor C26, which are similar to the previously described reset circuit.

The output of the last stage in counter 301 is connected directly to the first stage in counter 302. Here again, four flip-flops are utilized with the reset circuitry as previously described. An hours×10 counter, circuit 401 with a 0–2 count using two flip-flop stages 401(*a*), 401(*b*) is utilized in association with a reset circuit that is effective after twenty-four hours have been counted. In greater detail, the twenty-four hour reset circuit comprises a transistorized "AND" gate 402 and a gate 403 used to prevent the reset circuitry from affecting the flip-flop stage following the reset stage. The hours×10 counter 401 is driven by the hours counter 302 in the manner previously described in connection with the flip-flop counter circuits of counter 203. However, when the counter 401 is in a condition indicating that twenty hours have elasped and counter 302 indicates that four hours have elapsed, the "AND" gate 402 is energized and a tone gate 403 grounds the necessary points in the circuits to reset counters 302, 401 to a zero condition. The circuit for accomplishing this may be traced from conductor four of a B-matrix and conductor two of an A-matrix through "AND" gate 402 to the switch terminal of tone gate 403. Gate 403 turns "on" and applies a ground potential through diodes 304 to reset the hours counter 205 and through diode 305 to reset the hours×10 counter 206. There is no need to reset the counters 203, 204 at the twenty-fourth hour because they automatically reset themselves at the end of each count cycle.

Summarizing the operation of the clock circuitry, a one-pulse-per-minute input is utilized to drive a first flip-flop in a four stage binary counter circuit 203. The output of the fourth stage drives a three stage binary counter 301, and, in turn, drives a four stage binary counter 302 and a two stage binary counter 401. Special reset circuitry is added for obtaining a zero reset at the end of a twenty-four hour period.

In accordance with another aspect of the invention, means are provided for translating the binary output of the clock counters into a decimal form, the binary to decimal translation being performed by matrices A, B, C, and D. Of these, only the D-matrix is shown in detail, because all of the remaining matrices operate in the same manner. In greater detail, the output terminals of the flip-flop 203 are individually connected through diodes 210 to the input terminals of the D-matrix. For example, the terminal A is connected to the junction of the anodes of diodes D10, D11, and the terminal $\bar{A}$ is connected to the junction of diodes D12, D13. The remaining terminals are connected to the matrix in a similar manner.

Reference is made, by way of example, to a crosspoint T0 of the D-matrix where vertical multiple 226 and horizontal multiple 232 cross. The terminal T0 connects with the horizontal multiple 232 through diode D15 and to the vertical multiple 226 through diode D16. Connected to that same terminal T0 of the D-matrix through resistor R21 is a source of negative potential 227. All the other crosspoints of the matrix are connected in a similar manner, thus each terminal is isolated from a direct connection to the horizontal and vertical multiples by diodes.

For a more complete understanding of the operation of this exemplary matrix, assume that the binary data input from the clock is at the "0" count. In other words, assume one minute has not yet elapsed so that the potentials that appear at the terminals of the binary multivibrator flip-flop unit are in agreement with those indicated at input pulse 0 in the foregoing truth table. The binary counter terminals are connected to the matrix to limit the outputs of the matrix so that only one crosspoint is at a negative potential at a time. Thus, terminal A is at a negative potential and no current flows through diode D10 to conductor 226. Since terminal B is at a negative potential, no current flows through diode D17 to conductor 226. The ground potential on terminal $\bar{A}$ is transmited through diode D12 to conductor 229 and also through diode D13 to conductor 231. In a similar manner, the ground potential that appears on terminal $\bar{B}$ is transmitted through diode D18 to conductor 228.

Therefore, at the zero minute count, conductors 228, 229 and 231 are grounded and only conductor 226 among the vertical multiples is not grounded. Terminal C is at a negative potential and, therefore, it is not coupled to the horizontal multiple conductor 232 because diode D20 does not conduct negative potential in the direction going from terminal C to multiple conductor 232. Terminal $\overline{C}$ is grounded and, therefore, the horizontal multiple conductors 233, 234 are grounded through diodes D21, D22. Terminal D is also at a negative potential; it is isolated from conductors 232, 233 by diodes D23, D24. Therefore, conductors 233, 234 are grounded while conductor 232 is not grounded. Since conductors 226 and 232 are the only ones which are not grounded, only the crosspoint T0 between conductors 226, 232 is at the negative potential applied through resistor R21; the other crosspoints are at ground potential.

Means are provided for commanding the read-out of a block of data and for transmitting said block into a means for converting it to a decimal code. More particularly, the programmer 28 in this exemplary system is here shown as a solid state device consisting of four multivibrator bistable units (flip-flops) 231–234 interconnected to form a binary counter working in conjunction with a programmer matrix 236. The circuits of the flip-flops 231–234 are the same as those shown at 203, and the matrix 236 is similar to matrix D. The flip-flop stages are driven by pulses from the scan circuit 37 which operates at the lowest transmission speed of the system. Since there are four binary counter stages, the programmer is capable of producing sixteen decimal pulses. However, the circuit logic demands an eleven count decimal output; therefore, a reset circuit 237 is required to reset the programmer in the manner described in connection with the reset of the binary counters 203 in the clock circuit.

Figure 1:
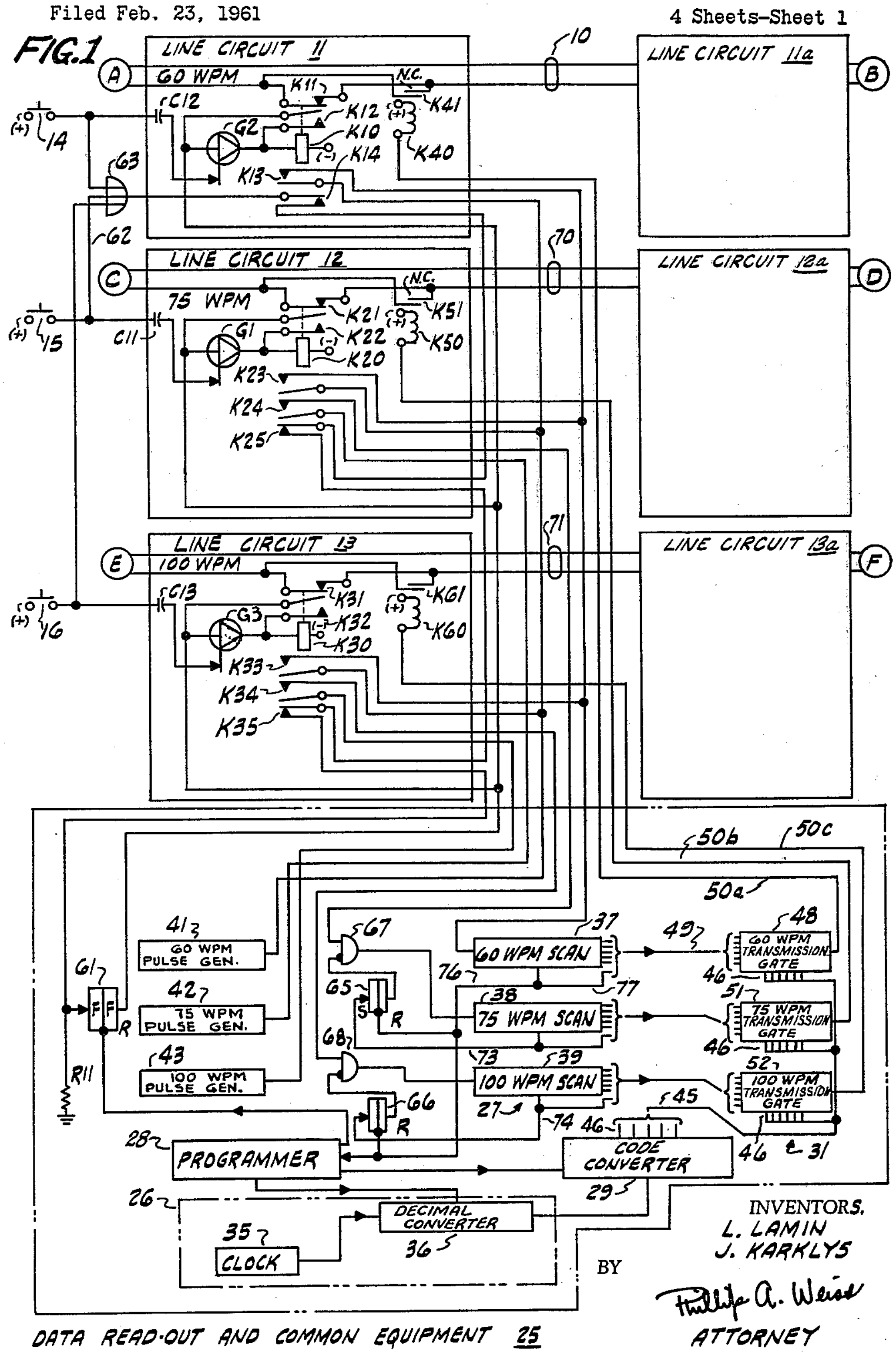

The eleven output signals from the programmer matrix control the following functions: a pulse at terminal 1 is a carriage return; at terminal 2, a line feed; at terminal 3, a figure command; at terminals 4, 5, 6 and 7, a clock matrices read-out command; at terminal 8, a letter command; at terminal 9, the letter Z; at terminal 10, a space; and at terminal 11, an end of cycle line release pulse for resetting the reset flip-flip 61 (FIG. 1).

Assume first that programmer 28 is in a condition wherein its terminal 11 is energized and that a drive pulse is received over conductor 76 from the scan circuit 37. The programmer cycles to its position 1 and energizes the "return" input of the converter circuit 29. The next drive pulse for the programmer occurs when the scan circuit 37 completes its cycle and starts to recycle. The programmer is driven by this pulse to energize its terminal 2 and the "LINE FEED" input of the converter 29. Upon receiving the next pulse from the scan circuit 37, the programmer is driven to energize the "FIGS" input of the converter 29.

Upon inspection of the drawing, it will be seen that the programmer terminals 4–7 connect, not to the converter 29, but to the A–D matrices. Moreover, it may be recalled that the potential applied to the programmer terminals 1–11 is ground potential when "deenergized" and negative potential when "energized." Therefore, as each programmer terminal is energized, the ground that formerly appeared is removed. Thus, the removal of ground from programmer terminals 4 enables the A-matrix; the programmer terminal 5 enables the B-matrix; from programmer terminal 6 enables the C-matrix; and from programmer terminal 7 enables the D-matrix.

Since all of the matrices are blocked and enabled in the same manner, the connections to the matrix D which are now to be described in detail apply to matrices A, B, and C also. Terminal 7 of the programmer matrix 236 is connected via diodes D26–D28 to all the horizontal multiple conductors of the D-matrix, namely conductors 232–234. Since terminal 7 of the programmer matrix is always at ground potential except while the programmer receives its seventh pulse, matrix D is blocked at all programmer pulses except the seventh since each terminal of the matrix is at ground except during this seventh pulse. When the terminal 7 is at a negative potential, the ground potential that had been extended from the programmer matrix through diodes D26–D28 to the D-matrix is removed. The matrix D is no longer blocked so that negative output is achieved from that matrix in the normal fashion.

The remaining output terminals of the programmer are connected to release and reset the system and the various circuits.

Therefore, it is seen that programmer 28 provides the means for commanding the receiving unit to perform certain "stunts," directing the control of the clock-matrices so that the "canned" information is sent at periods which coincide with signals from the scan circuit so as to operate the gates; and for sending an end of message line release signal.

Means are provided for converting the decimal code of the A–D matrices into a standard well known code comprising five units or characters of equal length normally used in transmission systems employing keyboard sending and typeprinted reception. More specifically, this function is accomplished in the converter circuit 29 which consists of five parallel conductors corresponding to the five code bars used on sending and receiving machines employing keyboard sending and teleprinted reception. For example, when terminal 1 of the programmer matrix is energized, a carriage return code signal is transmitted from the converter 29. That is, the five character code for carriage return is space, space, space, mark, space, in the named sequence. This, of course, is transmitted in conjunction with start and stop signals supplied by the scan circuits. In accordance with the disclosure of this system, negative potentials are applied from terminal 1 through diodes D30 to conductors 1, 2, 3 and 5 of the converter. These conductors are connected to the gate circuits via cable 45 which circuits operate to transmit a space if there is a negative potential the corresponding conductor and to transmit a mark if there is an absence of negative potental the corresponding conductor. The diodes D30 are used in the connections between the matrices and the converter for isolation purposes. That is, they pass a negative potential from programmer 28 to any of the five conductors of the converter but block any negative potential appearing on one of the conductors from going to another conductor.

There are common diode connections at 240 from the A–D matrices to the converter circuit 29 that are interconnected in a manner which converts the decimal code received from the matrix into the code. For example, all the numerals "one" are connected to the terminal 1 of converter 29. Terminal 1 is connected through a diode D32 to conductor 4 because the code for the numeral one is mark, mark, mark, space, mark. Thus, when a negative potential is applied through the diode D32 from any of the A–D matrices, it is transmitted to a gate circuit via conductor 4. In a similar manner all the decimal signals from the matrices are connected to corresponding terminals in the converter 29. In this manner all output terminals of the A–D matrices are connected through the converter to the gate circuits.

Means are provided for scanning each transmission gate circuit at a rate fixed by a corresponding transmission speed. That is, individual pulse generators 41—43 drive the scan circuit 37 at a 60 w.p.m. rate, the circuit 38 at a 75 w.p.m. rate, and the circuit 39 at a 100 w.p.m. rate. Since all are essentially the same, reference is made to circuit 37 by way of example. It is comprised of a three stage flip-flop binary counter and a matrix which converts the binary code to a decimal form and has eight outputs. This counter-matrix combination includes circuitry similar to that shown in connection with the flip-flop counter 203 and the D-matrix.

Responsive to the receipt of a pulse extended from the generator 41 through the associated line circuit 11, scan circuit 37 steps from a condition wherein its last terminal 8 is energized to its next step wherein its terminal 1 is energized. This serves as a "start" pulse and is applied to the transmission gate 48, to the programmer 28, and to the reset terminals of flip-flips 65, 66 to start the scan and read-out process.

The scanners for the higher transmission speeds are not driven directly by the pulses received from generators 42, 43 through the line circuits. Instead, inhibit gates 67, 68 are included in the circuits between the pulse source and scan circuits. Also, the output of the higher speed scan circuits, instead of being directed to the programmer, are connected to the set terminal of the flip-flip circuits 65, 66.

Individually associated with each of the scan circuits are the transmission gate circuits 48, 51, and 52 which are identical, each having five two input "AND" gates. The output of the "AND" gates are connected through isolating diodes (one of which is shown at D40) to a common output conductor (one of which is shown at 50*a*). These conductors are, in turn, connected to the line transmission means such as reed relay coils, K40, K50, K60 in all of the line circuits as shown in FIG. 1. One of the inputs of each of the "AND" gates is connected to the second through sixth terminals of the scan circuits. The other input of each of the "AND" gates is connected to the converter via cable 45. Thus, the receipt of simultaneous signals from a scan circuit and the converter causes an "AND" gate to conduct and a space to be transmitted. Since the start signal of the scan circuit is applied directly to the output conductor of the transmission gate, as through a diode D41, for example, the start space is transmitted to the line circuit under the control of the scan circuit.

In greater detail, terminals T32–T36 of scan circuit 37 are connected respectively to the terminals T41–T46 of "AND" gates 331, 332, 333, 334 and 335 of gate 48. The converter conductors 1–5 are connected respectively to terminals T47–T51 of the above named "AND" gates via cable 45. The outputs of the "AND" gates are connected respectively through isolating diodes such as diodes D40 and D42–D45 to output conductor 50*a* of gate 48. Therefore, scan circuit 37 first sends a start pulse through diode D41 to conductor 50. Next, scan circuit 37 enables the uppermost terminal of "AND" gate 331. If the converter 29 is then applying a voltage to the lowermost terminal, "AND" gate 331 conducts and if it is not then applying a voltage to such terminal, gate 331 does not conduct. Thereafter the scan circuit 37 energizes each of the remaining "AND" gates in turn and each conducts (or fails to conduct) depending upon whether a voltage thereto from the converter. When a gate conducts, a space is transmitted over the line by the operation of a reed relay in the line circuit. When a gate fails to conduct, a mark is transmitted due to the failure of the reed relay to operate.

Summarizing the description of this invention discloses an improved, economical and reliable teletypewriter system that provides automatic message transmission at different speeds, either individually or simultaneously. The system contains no rotating parts and is comparatively easy to construct, use and service.

While we have described the above principles of our invention in connection with specific apparatus, it is to be clearly understood that this description is made only by way of example and not as a limitation on the scope of our invention.

We claim:

1. A telegraph type communication system comprising a plurality of subscriber stations operating at different transmission speeds, means for providing information relating to messages that are repeatedly transmitted through said system, means associated with each of said stations for requesting read-out of said information, and means responsive to the operation of a plurality of said request means for automatically simultaneously transmitting said read-out information at the transmission speeds of said requesting stations.

2. A telegraph type communication system comprising a plurality of subscriber stations operating at different transmission speeds, means for providing information signals relating to messages that are repeatedly sent through said system, means individually associated with each of said stations for requesting read-out of said information at the transmission speed of the requesting station, means for translating said read-out information into teletype code at a rate fixed by at least one of said transmission speeds, means operated under control of the slowest of said translating means for programming the rate at which said information is read-out, and means for simultaneously transmitting said translated information through said system at all of said transmission speeds.

3. The system of claim 2 wherein said translating means comprises a plurality of scan circuits, means for driving each of said scan circuits at a rate of speed fixed by a corresponding one of said transmission speeds, means for converting said read-out information into markings selectively applied to a number of output conductors in a said code, a plurality of "AND" gates each having an input terminal individually connected to a corresponding one of said output conductors, and means interconnecting said scan circuits and other input terminals on said gates for selectively energizing said gates in accordance with said code and at a transmission speed fixed by said connected scan circuits.

4. The system of claim 3 wherein the means for driving each of said scan circuits comprises individually associated pulse generators each of which has a frequency corresponding to one of said transmission speeds and means responsive to the operation of said request means for connecting at least one of said generators to an associated scan means.

5. A data transmission system comprising a plurality of subscriber stations operating at different speeds, means for providing information signals required to transmit messages that are repeatedly sent through said system, means individually associated with each of said stations for requesting read-out of said information at the speed of the requesting station, a plurality of scan means, means for driving each of said scan means at a speed individually corresponding to one of said speeds, means responsive to said scan means for transmitting said read-out information at a plurality of said scan speeds simultaneously, the fastest of said transmitting means finishing said transmission first and the slowest of said transmitting means finishing said transmission last, means operated under control of the slowest said scan means for commanding the read-out of a first block of said information, means responsive to completion of said read-out by said fastest transmitting means for inhibiting further operation of said fastest transmitting means, and means responsive to the completion of said read-out by said slowest transmitting means for commanding the read-out of another block of said information.

6. The system of claim 5 and a plurality of groups of "AND" gates, means responsive to the output of each of said scan circuits for sequentially marking an input of each "AND" gate in a corresponding group of said "AND" gates, and means responsive to said read-out of said information for selectively marking other inputs, of said "AND" gates, whereby said "AND" gates conduct responsive to a simultaneous occurrence of said scan signals and said selective marking.

7. The system of claim 6 and a line circuit individually associated with each of said stations, and means for individually connecting the output of each "AND" gate in a group of said gates to a corresponding one of said line circuits.

8. A code transmission system including a source of information including means for providing said information in discrete blocks of data, a plurality of scan means each operating at a different speed, means for commanding the read-out of a block of data and for transmitting said block under control of each of said scan means, each of said scan means stopping after it completes the transmission of said block of said data, and means operated under control of the slowest of said scan means for commanding the read-out of the next block of said data.

9. A keyboard sending and teleprinted reception system comprising a plurality of subscriber stations operating at different printing speeds, means for indicating the passage of time in binary code, means for translating the binary code to a decimal code, means individually associated with each of said stations for requesting read-out of said indicated time, a plurality of scan means, each of said scan means operating at a speed individually corresponding to one of said speeds, means operated under the control of the slowest of said scan means for programming the read-out of said translating means, means responsive to the operation of any of said data request means for initiating the operation of at least one of said scan means and said programming means to cause said read-out of said translating means, means responsive to the receipt of said read-out decimal time indication for translating said decimal code into a standard fine element code, and means for simultaneously transmitting said read-out data through said system at the speeds of the stations associated with each operated request.

10. A keyboard sending and typeprinted reception system comprising a plurality of lines operated at different speeds with at least two subscriber stations associated with each of said lines, line circuits individual to each of said stations, means common to all of said stations for storing information relating to messages that are repeatedly sent through said system, means associated with each of said stations for requesting read-out of said information, a first means responsive to the operation of said request means for converting said information to a standard code, a second means responsive to the operation of said request means for transferring control of said lines associated with said requesting stations from said stations to said converting means, and line transmission means operating under the control of said converting means for transmitting said information at the speed of said transmitting station.

11. The system of claim 10 wherein said second means comprises a relay in each of said line circuits for opening contacts that short said line transmission means.

12. The system of claim 10 wherein said line transmission means comprises a reed relay in each of said line circuits for opening said line to transmit a space and for closing said line to transmit a mark.

13. In an automatic telegraph type communication system including a plurality of teletype lines operated at different transmission speeds with at least two subscriber stations associated with each of said lines, the combination comprising line circuits individual to each of said stations, means common to all of said stations for storing information relative to messages that are repeatedly sent through the system, means individual to each of said stations for initiating read-out of said information, means common to each of said stations operated responsive to a signal from any of said request means for causing the transmission of said read-out information over said teletype lines associated with said requesting stations, means in each of said line circuits for indicating that said common transmission causing means is busy, memory means in each of said line circuits for registering the operation of said associated request means, means responsive to a signal from the memory means when said common transmission causing means returns to an idle condition for reoperating said transmission causing means and means responsive to said transmission causing means for transmitting said information at the transmission speeds of said requesting stations.

14. The system of claim 13 wherein each of said memory means comprises a capacitor for storing a charge responsive to the operation of an associated one of said request means when said common transmission causing means is busy whereby said common transmission means is reoperated when it returns to an idle condition responsive to the discharge of any of said capacitors.

No references cited.